United States Patent [19]

Nakagawa et al.

[11] Patent Number: 5,276,608
[45] Date of Patent: Jan. 4, 1994

[54] INFORMATION PROCESSING SYSTEM FOR TELLER MACHINE FOR CORRECTING REGISTERED TRANSACTIONS

[75] Inventors: Shigemitsu Nakagawa, Yamatokoriyama; Kenji Iwagami, Hashimoto, both of Japan

[73] Assignee: Sharp Kabushiki Kaisha, Osaka, Japan

[21] Appl. No.: 708,804

[22] Filed: May 31, 1991

Related U.S. Application Data

[63] Continuation of Ser. No. 333,561, Apr. 5, 1989, abandoned.

[30] Foreign Application Priority Data

Apr. 5, 1988 [JP] Japan ................... 63-84838

[51] Int. Cl.$^5$ ............................. G06F 15/30
[52] U.S. Cl. ....................... 364/401; 235/380
[58] Field of Search ........... 364/405, 401; 235/279, 235/280

[56] References Cited

U.S. PATENT DOCUMENTS

| | | | |
|---|---|---|---|
| 4,432,057 | 2/1984 | Daniell et al. | 364/300 |
| 4,458,317 | 7/1984 | Horigome et al. | 364/405 X |
| 4,787,037 | 11/1988 | Ootsuka | 364/405 X |

FOREIGN PATENT DOCUMENTS

| | | |
|---|---|---|
| 0002968 | 1/1983 | Japan . |
| 0072571 | 4/1984 | Japan . |
| 0168572 | 9/1984 | Japan . |

OTHER PUBLICATIONS

PC-File/R User's Guide, version 1.0, Buttonware Inc., Bellevue, Wash., 1985, 19, 22.

Primary Examiner—Gail O. Hayes

[57] ABSTRACT

The disclosed information processing system of a teller machine allows to use the transaction consecutive number attached to each set of transaction data as the retrieval item, when correcting the already registered transaction data, in order to search the transaction data to be corrected in any one of the predetermined plural correction processing functions, and also to correct all of the registered transaction data.

2 Claims, 6 Drawing Sheets

INFORMATION PROCESSING SYSTEM FOR TELLER MACHINE FOR CORRECTING REGISTERED TRANSACTIONS

This application is a continuation of application Ser. No. 07/333,561 filed on Apr. 5, 1989, now abandoned.

BACKGROUND OF THE INVENTION

1. Field of the Invention

The present invention relates to an information processing system of a teller machine for processing transactions of cash and securities in the counter tasks at a bank or the like.

The term "transaction data" mentioned in the specification of the invention refers to the information about transaction in the counter tasks at a bank or the like, and should be interpreted as the concept comprising the transaction amount, the account number relating to the transaction, type of transaction and others.

2. Description of the Prior Art

A teller machine possesses, for example, the cash paid-out registration function for registering the cash paid-out, the cash paid-in registration function for registering the cash paid-in, and the change registration function for registering the changes, among others, and each transaction can be registering by entering, together with the transaction consecutive number (TCN), the type of transaction, transaction amount, account number and other transaction data. Such a teller machine is provided with plural types of correction processing functions, depending on the steps of registration operation, in order to correct the transaction data which is wrongly registered. Such correction processing functions may include the last item void function for canceling the transaction data right after registration of transaction data, the appoint void function for canceling the already registered transaction data in the midst of registration operation of plural sets of transaction data (before operation of the END key operated at the end of a registration operation), and the special void function for canceling the already registered transaction data after the operation of the END key (this special void function is available in three types), which can be properly set selectively depending on the step of the registration operation.

In the correction processing functions, there are correction processing function capable of using the transaction consecutive number assigned to each set of transaction data as the item for searching the transaction data to be corrected, and other functions not so capable. In the former function, by entering a specific transaction consecutive number, the transaction data corresponding to the transaction number can be searched. In the latter, the transaction number cannot be entered as a retrieval item, and in order to search the transaction data to be corrected, other retrieval items, such as the transaction amount or type of transaction, must be used. In this correction processing function, if the operator keeps in memory the transaction consecutive number assigned to the transaction data desired to be corrected, this transaction consecutive number cannot be used as the retrieval item, which is very inconvenient.

Meanwhile, the special void function cannot always cancel the already registered transaction data. That is, the teller machine has a memory region in which the transaction data is stored within a predetermined range, for example, a predetermined number of the transaction data by the latest registration, and the transaction data not registered in this memory region cannot be canceled, which is also inconvenient.

SUMMARY OF THE INVENTION

It is hence a primary object of the invention to provide an information processing system in a teller machine capable of solving the foregoing technical problems, entering the transaction consecutive number as the retrieval item in all type of correction processing functions for enhancing the convenience of operation.

It is another object of the invention to present an information processing system of a teller machine capable of correcting all the registered transaction data for enhancing the convenience of operation.

In order to achieve the above objects, the invention presents an information processing system in a teller machine by providing a teller machine which comprises:

first registration means for registering the transaction data accompanying transactions within a predetermined range for each transaction, second registration means for registering transaction information of each item of transaction of all transaction data including the transaction data registered in the first registration means, third registration means for registering all transaction data including the transaction data registered in the first registration means together with the transaction consecutive number in each transaction, and fourth registration means for registering the correction information relating to the registered content in the third registration means, whereby in a correction processing function for checking and correcting the content registered in the first registration means, in the event that the transaction data to be corrected is not found in the first registration means, the corresponding transaction consecutive number is entered, and the corresponding transaction data in the third registration means is corrected, and the correction data is thereafter registered as an updated data in the fourth registration means, with the corresponding transaction data in the second registration means also being corrected.

In the teller machine of the invention, in the first registration means, the transaction data accompanying a transactions within the predetermined range are registered in each transaction; in the second registration means, the entire transaction data (e.g. the total of transaction amount in each item of transaction) is registered; and in the third registration means, the transaction data is registered together with the transaction consecutive number in each transaction. In the first registration means, for example, the transaction data in the predetermined number of cases by the latest registration is registered. Therefore, all of the transaction data registered in the third registration means is not registered presently in the first registration means.

According to the invention, in the correction processing function for checking and correcting the content registered in the first registration means, even in the case that the transaction data to be corrected is not registered in the first registration means, by entering the transaction consecutive number attached to the transaction data, the corresponding registration content in the third registration means can be corrected. This collected data is sequentially registered as updated data in the fourth registration means. Therefore, such collected data can be easily checked after the termination of the registration tasks.

The invention also presents an information processing system in a teller machine by providing a teller which comprises:

first registration means for registering the transaction data accompanying transactions in a predetermined range for each transaction, second registration means for registering the transaction information of each item of transaction of all transaction data including the transaction data registered in the first registration means, and third registration means for registering the transaction data together with the transaction consecutive number in each transaction, whereby in a correction processing function for checking and correcting the content registered in the first registration means, in the event that the transaction data to be corrected is registered in the first registration means, the corresponding transaction data in the first and third registration means are corrected, while the corresponding transaction data in the second registration means is also corrected.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Figure 1:
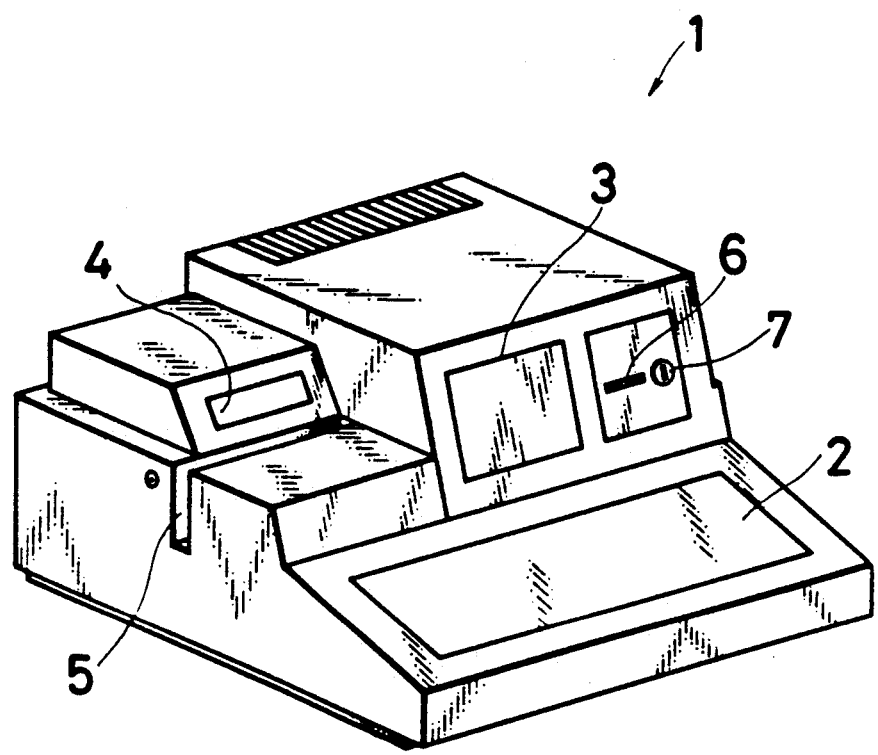
FIG. 1 is a perspective view showing the appearance of a teller machine 1 used in an embodiment of the invention.

Referring now to the drawing, preferred embodiments of the invention are described in details below.

FIG. 1 is a perspective view showing the appearance of an embodiment of the invention. A teller machine 1 is provided with a keyboard 2 and a display unit 3, and also comprises a window 4 for viewing the bank's duplicate sheet or the journal, and a slip inlet 5 provided for printing slips or the like. At the right side of the display unit 3, a knob 6 for adjusting the brightness of the display unit 3 and a mode switch 7 mentioned later are disposed.

Figure 2:
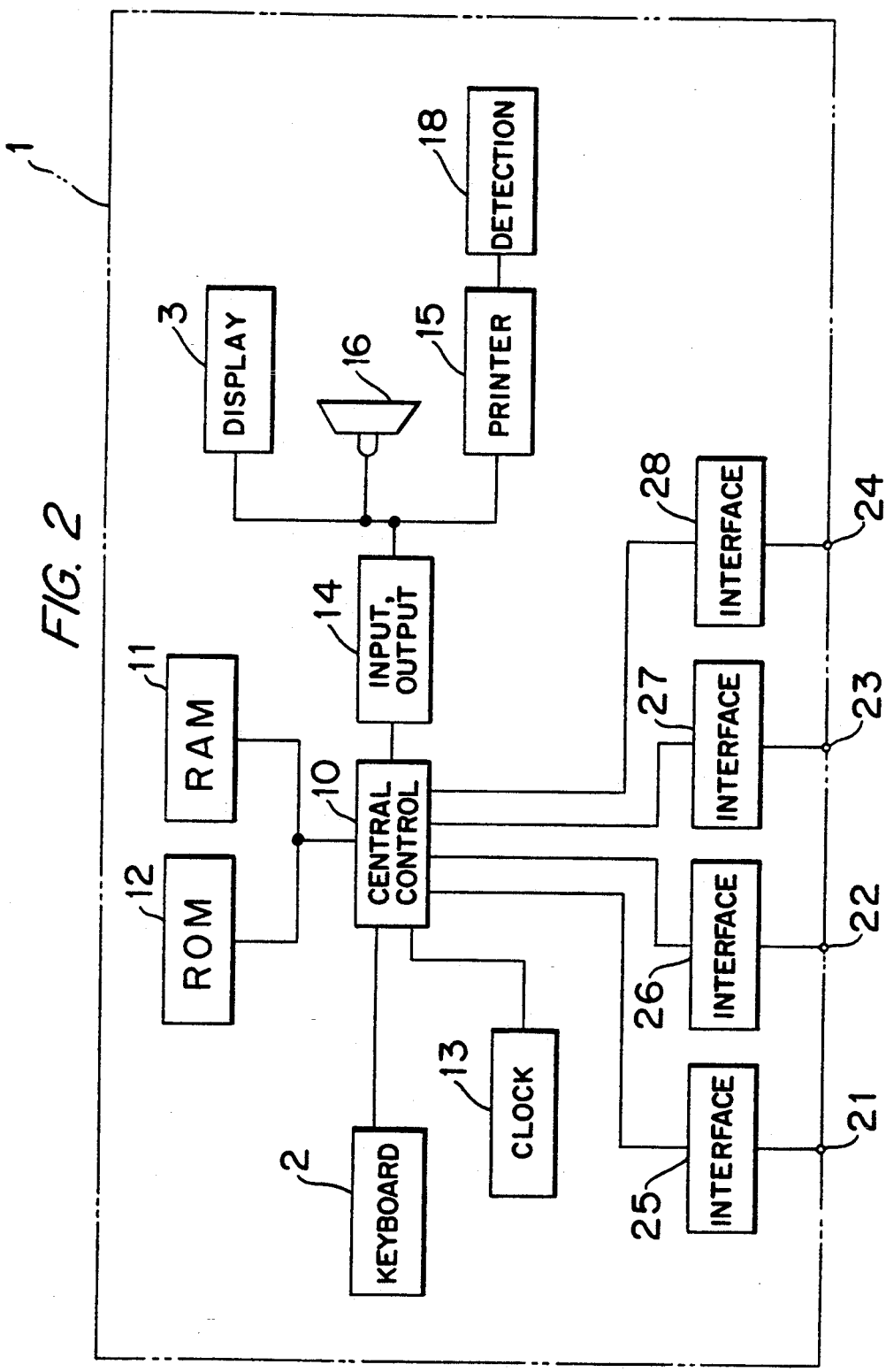
FIG. 2 is a block diagram showing an electric composition of the teller machine 1.

FIG. 2 is a block diagram showing an electric structure of the teller machine 1. The teller machine 1 comprises a central processing unit (CPU) 10 for electrically controlling the entire machine. To this central processing unit 10 are connected a random access memory (RAM) 11 and a read-only memory (ROM) 12, a clock signal generator circuit 13 and the keyboard 2. This central processing unit 10 is further combined with a printing device 15 for printing various articles through input and output circuit 14, a speaker 16 for issuing, for example, beeping sound, and the display unit 3. The printing device 15 comprises a detector circuit 18 for detecting whether the slip to be printed is at normal loading position or not.

This teller machine 1 has connection terminals 21 to 24 to be connected with, for example, MCR (magnetic card reader), MICR (magnetic ink character reader), MICR printer, OCR (optical character reader) and external line (offline) with a host computer, not shown. These terminals 21 to 24 are connected to the central control unit 10 through interfaces 25 to 28.

Figure 3:
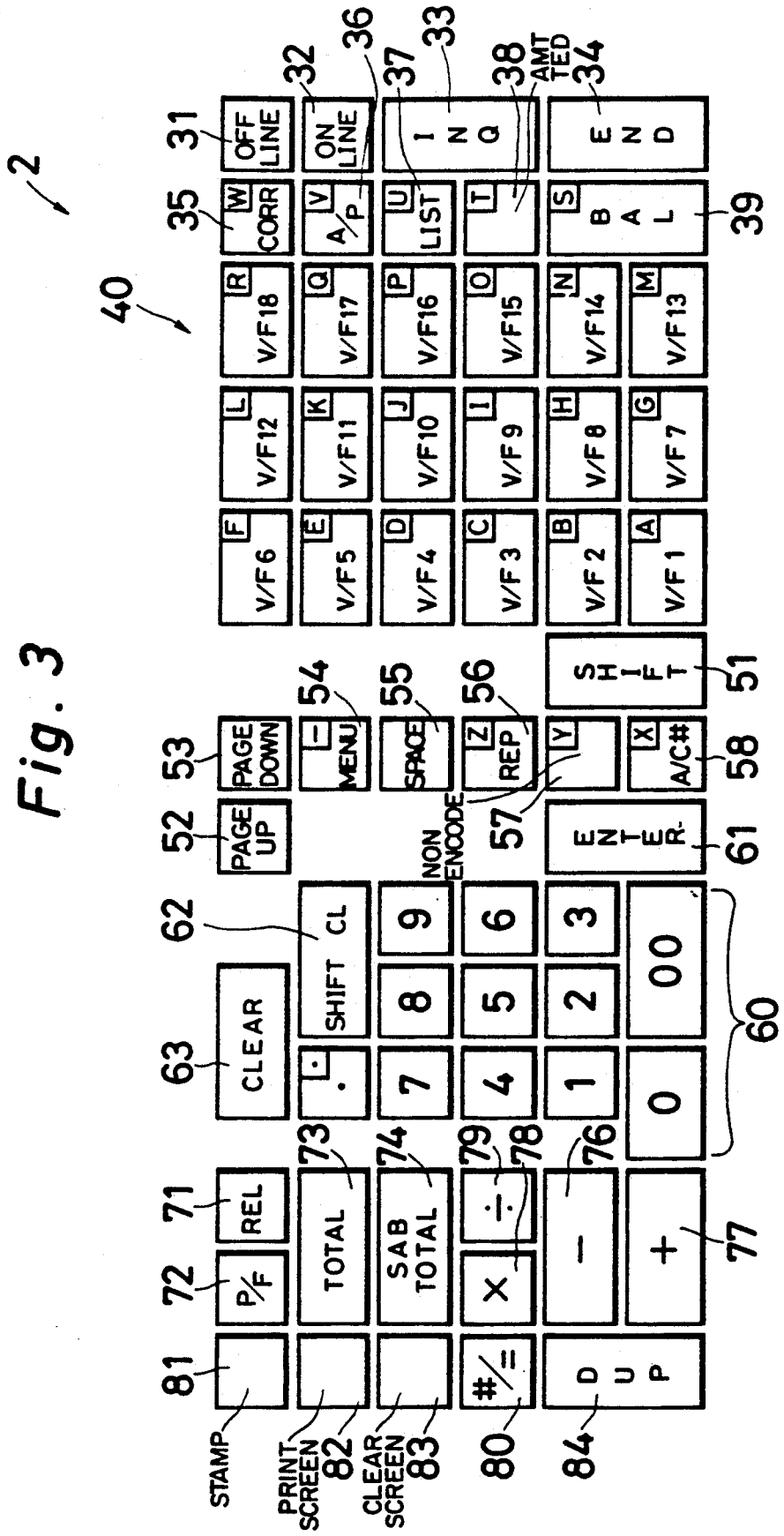
FIG. 3 is a plan view of a keyboard 2.

FIG. 3 is a plan view of the keyboard 2. Referring to FIG. 3, the function of each input key is explained below.

An offline key 31 and an online key 32 are the keys for selectively setting the offline mode or online mode. An INQ key 33 is used for inquiring the data to the host computer. An END key 34 is used when terminating the registration procedure. A CORR key 35 is used when correcting the already entered data. Whether the journal is printed or not is selected by an A/P key 36. A LIST key and an AMTTED key 38 are used to set the list mode and amount tendered mode. A BAL key 39 is used when calculating the balance.

A function key group 40 comprises, for example, 18 function keys. The function keys are assigned with registration functions for cash paid in, cash paid out, exchange to foreign currency, exchange to domestic currency, and others. A shift key 51 is used, for example, when entering alphabetical letters assigned as second functions to each key of function key group 40.

A page up key 52 and a page down key 53 are used for feeding forward or backward the pages of the list displayed on the display unit 3. When a menu key 54 is pressed, the menu of various predetermined programs is displayed on the display unit 3. A space key 55 is used for providing a space when entering data.

The amount entered by a numeric key group 60 is repeatedly entered/displayed by pressing on REP key 56. A NON ENCODE key 57 is for selecting temporary cancellation of amount printing to the MICR printer. When entering an account number, the operations of the numeric key group 60 and the A/C# key 58 are combined. The programs displayed on the display unit 3 by the menu key 54 are selected by the combination of operations of numeric key group 60 and ENTER key 61. A SHIFT CL key 62 is used, for example, when erasing the lowest digit of the amount entered by the numeric key group 60. A CLEAR key 63 is used, for example, when erasing the amount entered by the numeric key group 60 or cancelling the error state.

A REL key 71 is used, for example, when cancelling the list mode set by the LIST key 37, or erasing the account number being entered. A P/F key 72 is used for feeding the journal without printing. A total key 73 is for clearing the result of operation calculated by a subtotal key 74 shown below. And the subtotal key 74 is used for calculating the result of operation performed by subtraction key 76 and addition key 77. The result of operation by multiplication key 78 and division key 79 is calculated by an equal key 80.

A stamp key 81 is used for printing predetermined symbol or character on the journal or slip. A print screen key 82 is used when printing out the data presently shown in the display unit 3. A clear screen key 83 is used for erasing the data shown in the display unit 3. A DUP key 84 is used when duplicating the data, such as the amount (and account number), on the slip.

The function keys in the function key group 40 (hereinafter generally called function key F) are preliminarily assigned with various functions corresponding to the predetermined transaction type, such as the cash paid-out registration function for registering the cash paid out, the cash paid-in registration function for registering the cash paid in, and the change registration function for registering the change. The function key F can be preliminarily assigned with a sign corresponding to the predetermined transaction type, such as the plus sign or minus sign. For example, the function key F having the cash paid-in registration function is assigned with the plus sign, and the function key F having the cash paid-out registration function is assigned with the minus sign.

The teller machine 1 is provided with plural correction processing functions, depending on the steps of registration operation, in order to correct the transaction data which is wrongly registered. Such correction processing functions may include the last item void function for canceling the transaction data right after registration of transaction data, the appoint void function for canceling the already registered transaction data in the midst of registration operation in plural sets of transaction data (before operation of the END key 35 operated at the end of a registration operation), and the special void function for canceling the already registered transaction data after the operation of the END key 35 (this special void function is available in three types), which can be properly set selectively depending on the step of the registration operation.

Figure 4:
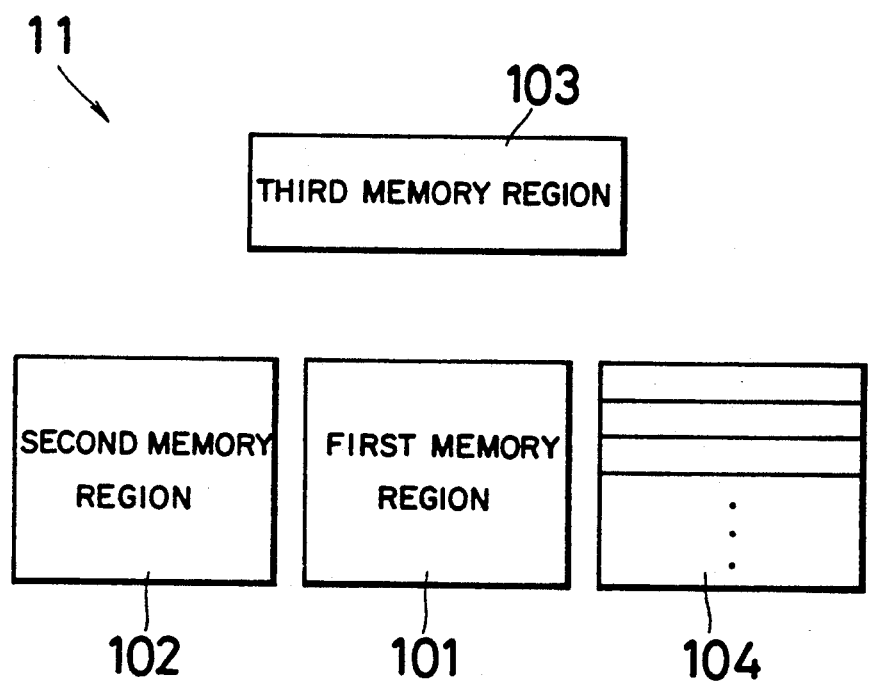
FIG. 4 is a block diagram showing the composition of first to fourth registration means.

FIG. 4 is a block diagram showing the composition of the first to fourth registration means. In a first memory region (check buffer) 101 which is the first registration means, for example, the latest registration content of the predetermined number of cases, such as the transaction consecutive number of each transaction, type of function key corresponding to the transaction, and transaction amount are stored. In a second memory region (batch buffer) 102 which is the second registration means, the total amount of each item of transaction, and the number of cases are stored. In a third memory region (grand buffer) 103 which is the third registration means, for example, all the transaction contents being presently registered, that is, the transaction consecutive number of each transaction, the type of function key corresponding to the transaction, and transaction amount are stored.

In the appoint void function and special void function, the transaction data to be corrected is retrieved, in principle, at the first and second memory regions 101, 102.

When the transaction contents to be corrected are stored in the first and second memory regions 101, 102, they can be corrected respectively in the memory regions 101, 102. For example, the corresponding transaction content is deleted from the first memory region 101, and the corresponding transaction amount is subtracted from the second memory region 102.

In the first memory region 101, as stated above, since only the transaction contents in the predetermined range are stored, the already registered transaction content that is desired to be corrected may be stored in the second memory region 102, and not stored in the first memory region 101. Such transaction content is always stored in the third memory region 103. In the case of cancellation processing of such transaction content by the special void function of a correction type 2 mentioned later, for example, the cancellation is processed in the third memory region 103, and the correction data showing the canceled transaction content is stored in a fourth memory region 104 which is the fourth registration means. The correction data to be stored in the fourth memory region 104 may include the transaction consecutive number relating to the transaction content that has been corrected, the transaction amount, the type of function key corresponding to the transaction, and the type of correction function.

A practical correction operation is explained below.

CORRECTION EXAMPLE 1

When the transaction shown in Table 1 is stored in the first memory region 101, the input of the transaction amount $100.00 and function key type V/F1 in the appoint avoid function causes the transaction content "D" to be deleted.

CORRECTION EXAMPLE 2

In the same condition as in Correction Example 1, the input of transaction consecutive number 1234, transaction amount $100.00 and function key type V/F1 causes the transaction content "A" to be deleted. In this case, if the transaction consecutive number 1234 is not entered, the transaction content "D" is deleted same as in Correction Example 1.

TABLE 1

|  | TCN | Amount | Function key type |
|---|---|---|---|
| "A" | 1234 | 100.00 | V/F1 |
| "B" | 1235 | 150.00 | V/F3 |
| "C" | 1236 | 1000.00 | V/F5 |
| "D" | 1237 | 100.00 | V/F1 |
| "E" | 1238 | 50.00 | V/F6 |

In correction processing, as mentioned above, a last item void function, appoint' void function and special void function may be selectively set. In each correction processing function, either a correction type 1 or a correction type 2 can be selected by an initial setting. These two correction types 1, 2 are explained below.

1. Correction type 1

In this type, when a first special void function of the special void functions is selected, the transaction consecutive number can be entered as the retrieval item for searching the transaction content to be corrected, and in the first memory region 101, the transaction content corresponding to the transaction consecutive number entered as the retrieval item and transaction amount is deleted. In a second special void function, the transaction consecutive number cannot be entered as the retrieval item, and only the transaction amount entered as retrieval item is checked in the first memory region 101, and the corresponding transaction content is deleted. In the third special void function, although the transaction consecutive number can be entered as the retrieval item, the transaction content in the first memory region 101 cannot be deleted.

In the appoint void function, the transaction consecutive number cannot be entered as the retrieval item, and only the transaction amount entered as the retrieval item is checked in the first memory region 101, and the corresponding transaction content is deleted.

In the last item void function, the transaction consecutive number cannot be entered as the retrieval item, and only the transaction content registered last can be deleted.

2. CORRECTION TYPE 2

In the first to third special void functions and appoint void function in this type, the transaction consecutive number can be entered as the retrieval item in all cases. In these four types of correction functions, meanwhile, if the transaction content to be corrected is not found in the first memory region 101, the correction is processed in the third memory region 103. This correction data, as mentioned above, is stored sequentially in the fourth memory region 104. The last item void function, possesses the same content as the last item void function of the correction type 1.

These two correction types are selected by an initial setting. That is, when a binary setting code "0" is set, the correction type 1 is selected, and when a binary setting code "1" is set, the correction type 2 is selected.

Figure 5:
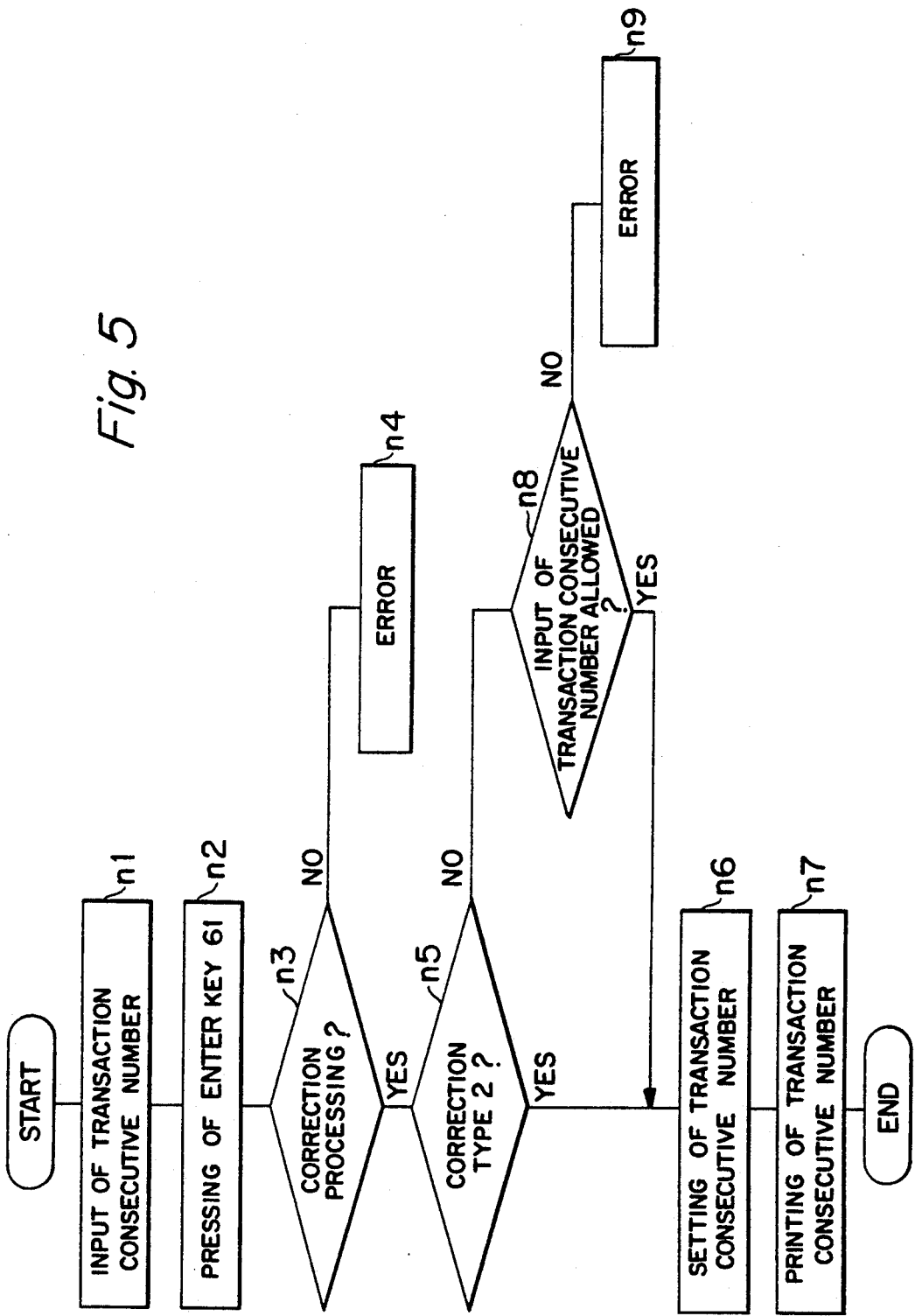
FIG. 5 is a flow chart showing the input processing of the transaction consecutive number attached to the transaction data for retrieving the transaction data to be corrected.

FIG. 5 is a flow chart showing the entering process of using the transaction consecutive number of the transaction content to be corrected as the retrieval item.

At step n1, the transaction consecutive number of the transaction content to be corrected is entered as the retrieval item through the numeric key group 60, and at step n2 the ENTER key 61 is pressed. At step n3, it is judged whether any one of the correction processing functions is set or not, and if not, it results in an error state at step n4.

If any one of the correction processing functions is set at step n3, the operation advances to step n5, in which it is judged whether the correction type 2 is set or not. If the correction type 2 is set, the transaction consecutive number entered at step n1 is set at step n6. This transaction consecutive number is printed at step n7.

When the correction type 1 is set, it is judged at step n8 whether the transaction consecutive number can be entered as the retrieval item or not in the presently selected correction function. In other words, in the correction type 1, the transaction consecutive number cannot be entered as the retrieval item in the second special void function and appoint void function. In such case, it results in an error state at step n9. In the case of the selected correction function allowing the transaction consecutive number to be entered as the retrieval item, the operation goes to step n6.

In this way, when the correction type 2 is set, the transaction consecutive number can be entered in all correction functions (except for the last item void), and the functionability in correction processing is enhanced.

Figure 6:
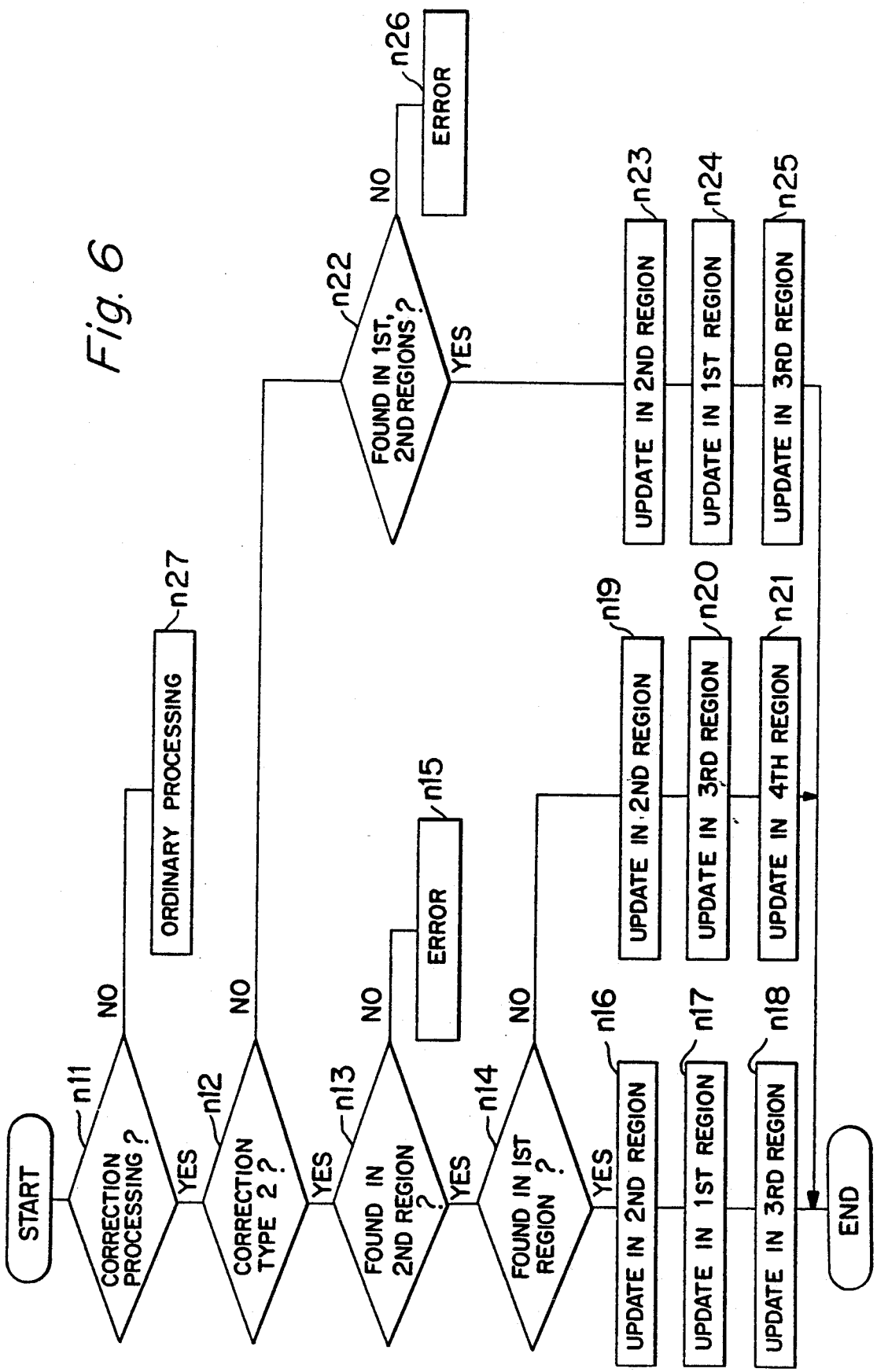
FIG. 6 is a flow chart showing the correction processing action in an embodiment of the invention.

FIG. 6 is a flow chart showing the correction processing in one of the embodiments of the invention.

At step n11, it is judged if any one of the correction functions is set or not, and if set, it is judged at step n12 whether the correction type 2 is set or not. In the case of correction type 2, at step n13, it is judged if the transaction content to be corrected is stored in the second memory region 102 or not. If stored, the operation advances to step n14; otherwise, it results in an error state at step n15.

That is, the transaction content not stored in the second memory region 102 is not, as a matter of fact, registered yet in the teller machine 1, and it cannot be corrected or otherwise processed.

At step n14, when the transaction content to be corrected is stored in the first memory region 101, the corrected data is stored as the registered data in the second memory region 102 at step n16. At step n17 and step n18, the corrected data is stored as a registered data in the first memory region 101 and third memory region 103.

At step n14 the display unit 3 indicates whether the transaction content to be corrected is stored in the first memory region. If no transaction content is present in the first memory region, a transaction consecutive number is obtained from the display unit 3 and is inputted via the keyboard 2 and the operation skips to step n19, in which the corrected data is stored as the registered data in the second memory region 102. At step n20, the corrected date is stored as the registered data in the third memory region 103.

At step n21, the corrected data, that is, the transaction consecutive number of the corresponding transaction content, the transaction amount, the type of function key, and the type of correction function are stored in the fourth memory region 104.

If set in correction type 1, at step n22, it is judged whether the transaction content to be corrected is stored in the first and second memory regions 101, 102, and if stored, the operation advances to step n23, and otherwise it results in an error state at step n26. At step n23, the correction data is stored as the registered data in the second memory region 101, and at step n24, the correction data is stored as the registered data in the first memory region 101. At step n25, the correction data is stored as the registered data in the third memory region 103.

If any one of the correction function is not set at step n11, it is judged as an ordinary processing, and the transaction content is updated and stored in the first and second memory regions 101, 102 at step n27.

Thus, in this embodiment, even if the transaction content to be corrected is not stored in the first memory region 101, it can be corrected. Moreover, since the correction data at this time is stored in the fourth memory region 104, it is possible to realize the confirmation of the correction data extremely rapidly and relatively easily after the termination of teller machine operation.

What is claimed is:

1. An information correction processing system in a teller machine, comprising:

first means for initiating and controlling a transaction data correction processing function for checking and correcting the transaction data;

second means for retrieving transaction numbers consecutively;

third means for entering a transaction number into the system following initiation of the transaction data correction processing function;

first registration means for storing a predetermined limited amount of transaction data for each transaction;

second registration means for storing transaction information of each item of transaction for each transaction including the transaction data stored in said first registration means;

third registration means for storing all transaction data including the transaction data stored in said first registration means together with the transaction consecutive number in each transaction; and fourth registration means for storing the correction information relating to the stored content in sad third registration means;

said first means, when the transaction data to be corrected is found in said first registration means, correcting the transaction data therein and correcting the same transaction data in said second and third registration means;

said first means retrieving, when the transaction data to be corrected is not found int eh first registration means, the corresponding transaction consecutive number from the third registration means and thereafter correcting corresponding transaction data in said second registration means together with the corresponding transaction data in said third registration means;

said fourth registration means storing the corrected data as data for later confirmation access.

2. An information correction processing system in a teller machine, comprising:

first means for initiating and controlling a transaction data correction function for checking and correcting the transaction data;

first registration means for storing a predetermined limited amount of information for each transaction;

second registration means for storing the transaction information of each item of transaction for each transaction including the transaction data stored in said first registration means; and third registration means for storing all the transaction data of each transaction and additionally including the transaction consecutive number for each transaction;

said first means, when the transaction data to be corrected is stored in said first registration means, correcting the corresponding transaction data in said second registration means and said third registration means without regard to the transaction consecutive number.

* * * * *